2,843,615

ORGANOPHOSPHORUS-SILICON COMPOSITIONS

Robert G. Linville, Burnt Hills, N. Y., assignor to General Electric Company, a corporation of New York No Drawing. Application May 31, 1956
Serial No. 588,229

13 Claims. (Cl. 260—448.8)

This invention is concerned with the preparation of organophosphorus derivatives of silicon. More particularly, the invention relates to the preparation of organophosphorus derivatives of silicon containing the grouping (I)
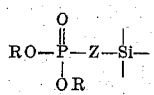

where R is a member selected from the class consisting of monovalent hydrocarbon radicals and monovalent hydrocarbon radicals which are substituted with inert substituents, and Z is a divalent alkylene radical of at least two carbon atoms, e. g., those selected from the class consisting of the ethylene (—$CH_2$—$CH_2$—), propylene [—$CH_2$—$CH_2$—$CH_2$— and —CH—CH($CH_3$)—], etc., radicals, the remaining valences of silicon being satisfied by atoms of the class of carbon and oxygen atoms, at least one of the valences being satisfied by an —OR' group where the organosilicon composition is a monomeric silane, R' being a monovalent hydrocarbon. The invention relates to both monosilicon-containing compositions and polysilicon-containing compositions, e. g., in the form of polysiloxane linkages in which silicon is separated from the adjacent silicon atom by oxygen. The invention includes within its scope monomeric compositions of the formula (II)
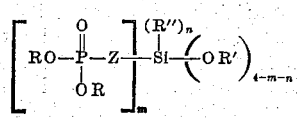

where R and Z have the meanings given above, R' is a monovalent hydrocarbon radical, R" is a member selected from the class consisting of monovalent hydrocarbon radicals and halogenated monovalent hydrocarbon radicals, $m$ is an integer equal to from 1 to 3, $n$ is a whole number equal to from 0 to 2 inclusive, the sum of $m+n$ not exceeding 3. If desired, the monomeric compositions may have the formula (III)
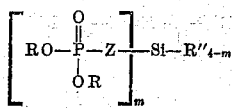

where R, R", Z, and $m$ have the above meanings.

A still further feature of the invention includes polymers prepared from the monomeric organophosphorus derivatives of silicon described above (II), and methods for making both the monomers and the polymers, said methods contemplating not only homopolymers from the organophosphorus derivatives of silicon, but also cohydrolysis and intercondensation products of the organophosphorus derivatives of silicon with other cohydrolyzable and copolymerizable monomers and polymers.

The presence of at least two carbon atoms between the phosphorus atom and the silicon atom of my claimed composition unexpectedly lends marked stability in the presence of strong alkali or acids. A bridge of only one carbon atom (in the form of a methylene radical) interposed between the silicon and phosphorus, is readily cleaved in the presence of the same reagents.

The organophosphorus derivatives of silicon (hereinafter referred to as "organophosphorus derivatives") of the present invention have utility in various applications. The monomeric silicon derivatives can be employed as additives for organopolysiloxane lubricating fluids to improve the lubricity characteristics thereof. These monomeric materials can be used for either hydrolysis alone or can be intercondensed with other hydrolyzable organosilanes to make useful organopolysiloxane resins, rubbers, oils, etc. Because of the presence of the substituted phosphorus atom in the organosilicon composition, it is possible to obtain improved lubricity of organopolysiloxanes prepared from such monomeric materials and such improved lubricity is present even under heavy loads.

Hydrolyzable compositions containing the organophosphorus-silicon linkage (Formula I) can be hydrolyzed to make organopolysiloxane resins which can be used in applications requiring resistance to high temperatures. Organopolysiloxane rubbers having good resistance to heat and also being capable of remaining flexible at low temperatures as low as —125° C. can also be prepared from the organophosphorus derivatives of silicon by hydrolyzing hydrolyzable monomeric organophosphorus silanes alone or cohydrolyzing the latter with other hydrolyzable organosilanes. Silicone rubbers obtained in this fashion have the added property of being greatly resistant to swelling in aromatic solvents such as in benzene, toluene, etc. The usual organopolysiloxane rubbers are poorly resistant to solvents of this type and in contact with such solvents, swell to an undesirable extent. The presence of the organophosphorus grouping in the organopolysiloxane material reduces this tendency to swell and permits use of organopolysiloxane rubbers (or silicone rubbers) in applications heretofore unsuitable for the usual silicone rubber.

There are several ways in which the monomeric organophosphorus derivatives of silicon can be prepared. One method which I have found especially suitable and which gives good yields of the desired product is obtained by effecting reaction between a compound having the formula

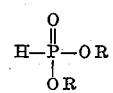

and an organo-silicon composition (either monomeric or polymeric) containing the grouping

where R has the meaning given above and A is an alkenyl radical selected from the class consisting of vinyl, allyl, and methallyl radicals.

A more specific method for making some monomeric compositions involves reaction of a diorganohydrogenphosphite of the formula

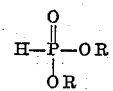

with an alkenyl organoxy (e. g., alkoxy) silane of the formula

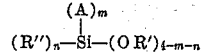

where R, R', R", A, $m$ and $n$ have the meanings given above, the sum of $m+n$ not exceeding 3. Thus, for instance, diethyl hydrogen phosphite of the formula $$H-\overset{O}{\underset{\parallel}{P}}-(OC_2H_5)_2$$

is reacted with an alkenyl silane such as vinyltriethoxysilane to give a composition having the formula $$H_5C_2O-\overset{O}{\underset{\parallel}{\underset{|}{P}}}-CH_2-CH_2-Si-(OC_2H_5)_3$$
$$\phantom{H_5C_2O-P}OC_2H_5$$

Obviously, other alkenyl groups can be substituted on a silicon atom prior to reaction with the organohydrogen phosphite, as, for instance, allyl radicals, methallyl radicals, chloroallyl radicals, etc., and the number of such alkenyl radicals on the silicon may be also varied equal to at most three so that each alkenyl radical can be substituted with an organophosphite radical, the hydrogen of the organophosphorus compound being used to satisfy the unsaturation of the alkenyl group in the manner designated above.

To illustrate more clearly the possibility of having more than one alkenyl group on the silicon atom, there is described below an equation which illustrates such a reaction:

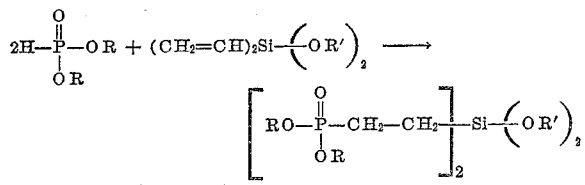

where R and R' have the meanings given above.

In addition, it will be apparent to those skilled in the art that the organic groups which form the organoxy radical on the phosphorus atom as well as the organic groups of the organoxy radical on the silicon atom can also be varied within wide limits in the manner described above.

In addition to effecting reaction of the organic hydrogen phosphite with alkenyl silanes containing silicon-bonded organoxy groups, one may also effect reaction with alkenyl silanes, which in addition to the alkenyl group and the organoxy group, contain silicon-bonded organic radicals, e. g., monovalent hydrocarbon radicals. Such types of hydrolyzable compositions are described and exemplified by Formula II where R'' is a member selected from the class consisting of monovalent hydrocarbon radicals and halogenated monovalent hydrocarbon radicals.

Among the values which R, R', and R'' may be when these atoms are monovalent hydrocarbon radicals are, for instance, alkyl radicals (e. g., methyl, ethyl, propyl, isopropyl, butyl, hexyl, dodecyl, etc.); cycloaliphatic radicals (e. g., cyclopentyl, cyclohexyl, etc.); aryl radicals (e. g., phenyl, diphenyl, naphthyl, etc.); alkaryl radicals (e. g., tolyl, xylyl, ethylphenyl, etc.); aralkyl radicals (e. g., benzyl, methylbenzyl, phenylethyl, phenylbutyl, etc.) and their homologues. In addition, one may have halogenated derivatives of said radicals, for instance, chlorophenyl radicals, bromophenyl radicals, fluorophenyl radicals, chloroethyl radicals, as well as other substituents on the monovalent hydrocarbon radical which are inert in the reaction required to prepare the compositions either in the monomeric or polymeric form. It will, of course, be apparent to those skilled in the art that R, R', and R'' may be the same or different monovalent hydrocarbon radicals or substituted monovalent hydrocarbon radicals.

Examples of organophosphorus derivatives which may be employed in the reaction for making the monomeric organophosphorus derivatives of silicon are, for instance, dimethyl hydrogen phosphite having the formula $$H-\overset{O}{\underset{\parallel}{P}}-(OCH_3)_2$$

diethyl hydrogen phosphite having the formula $$H-\overset{O}{\underset{\parallel}{P}}-(OC_2H_5)_2$$

dibutyl hydrogen phosphite having the formula $$H-\overset{O}{\underset{\parallel}{P}}-(OC_4H_9)_2$$

diphenyl hydrogen phosphite having the formula $$H-\overset{O}{\underset{\parallel}{P}}-(OC_6H_5)_2$$

etc. Such compositions are advantageously prepared for instance, by effecting reaction between phosphorus trichloride with a monohydric alcohol of the aliphatic or aromatic series. Thus, phosphorus trichloride and ethanol may be reacted in accordance with the equation $$PCl_3 + 3C_2H_5OH \longrightarrow H-\overset{O}{\underset{\parallel}{P}}-(OC_2H_5)_2$$

Obviously other monohydric alcohols and other hydroxy organic compounds, such as phenol, etc., may be substituted in place of the ethyl alcohol to give the desired hydrogen organophosphite.

Among the alkenyl silanes which may be employed for reaction with the hydrogen organophosphite are, for instance, vinyltriethoxysilane, divinyldiethoxysilane, vinyltrimethoxysilane, allyl triethoxysilane, methyl vinyl diethoxysilane, phenyl vinyl dipropoxysilane, trivinyl ethoxysilane, dimethyl vinylethoxysilane having the formula $$CH_2=CH-\underset{\underset{CH_3}{|}}{\overset{\overset{CH_3}{|}}{Si}}-OC_2H_5$$

methallyl butyl dibutoxysilane, vinyl ethyldiethoxysilane, vinyl trimethylsilane, diallyldiphenylsilane, etc.

I have found that improved reaction between the hydrogen organophosphite and the alkenyl silane is obtained if one employs a free radical producing catalyst, particularly azonitriles, as the catalyst for the reaction. Among such catalysts may be mentioned, for instance, aliphatic azo compounds of the general formula R—N=N—R where R is a monovalent hydrocarbon radical more particularly described above and preferably at least one R is an aliphatic radical, for instance, alkyl radical. Included among the aliphatic azo compounds are, for instance, azomethane, azo-acetonitrile, 2-azo-bis-isobutyronitrile, 2-azo-bis-ethylisobutyrate, etc. Further examples of aliphatic azo compounds and methods of preparing the same are more particularly disclosed in Hunt Patent 2,471,959, issued May 31, 1949. By reference this patent is made a part of the disclosures in the instant application.

One class of azo compounds which may be advantageously employed is that corresponding to the general formula $$R'''-\underset{\underset{R'''}{|}}{\overset{\overset{R'''}{|}}{C}}-N=N-\underset{\underset{R'''}{|}}{\overset{\overset{R'''}{|}}{C}}-R'''$$

where R''' may be the same or different monovalent hydrocarbon radicals of the type described for R above and may also be hydrogen. If desired one R''' may be a monovalent functional group, e. g., —CN, —COOH, —COOCH$_2$R, where R is a monovalent hydrocarbon described above, —CONH$_2$, etc.

Other catalysts for the reaction which have been found useful are, for instance, organic peroxides and other per compounds, such as tertiary butyl perbenzoate, benzoyl peroxide, tertiary butyl peroxide, etc., the potassium complex of the dimethylether of diethylene glycol, potassium isopropoxide, potassium diphenyl amide, potassium naphthalene, potassium metal, etc.

The amount of catalyst employed can generally be varied and is not critical. However, it is usually desirable to employ the catalyst in amounts ranging from about 0.05 to 5%, by weight, based on the weight of the alkenyl organoxy silane.

The means whereby the reaction between the organophosphorus compound and the alkenyl organoxysilane is carried out is relatively simple. In general, it comprises heating the reactants, preferably, though not essentially, in the presence of a suitable catalyst at temperatures ranging from about 75° C. to below the decomposition point of either the reactants or the reaction product. Temperatures as high as 225° to 250° C. may be employed without detrimental effect. In carrying out the reaction, one may employ normal or atmospheric pressures or the reaction may be carried out at elevated pressures, for instance, in pressure reactors. The use of pressure reactors permits the use of lower temperatures and shorter periods of time. When employing atmospheric pressure, times ranging from about 1 to 12 hours are often required while at elevated temperatures this period of heating to obtain desirable yields of the reaction product can be materially reduced. Although molar equivalents of the hydrogen organophosphite and of the alkenylsilane may be used advantageously, one employs from about 0.5 to 3 or more mols of the hydrogen organophosphite per mol of the alkenylsilane.

In order that those skilled in the art may better understand how the present invention may be practiced, the following examples are given by way of illustration and not by way of limitation. All parts are by weight.

EXAMPLE 1

About 120 parts vinyltriethoxysilane and 100 parts diethylhydrogenphosphite having the formula

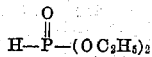

were placed in a reaction vessel with an amount of the potassium complex formed by interacting one part potassium metal with 20 parts of dimethyl Cellosolve. The reaction mixture was heated for six hours at atmospheric pressure at a temperature of 150° C. and then fractionally distilled. There was thus obtained about 48 parts of diethyl phosphonoethyltriethoxysilane having the formula

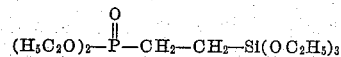

This material was analyzed by infrared spectrum and showed no presence of a P—H bond of the diethyl hydrogen phosphite, and showed no double bond of the vinyltriethoxysilane. The adduct had very strong characteristic peaks indicating the presence of the

grouping as well as the P—O—C grouping and the —Si(OC$_2$H$_5$)$_3$ grouping. The product which was obtained in about 24% yield, based on the vinyltriethoxysilane used, was analyzed for phosphorus content and found to contain close to the theoretical amount (9.5%) phosphorus. Essentially the same results were obtained by employing as a catalyst potassium metal but using a pressure reactor and carrying out the reaction at 170° C.

EXAMPLE 2

Into a three-necked flask were placed 50 parts vinyltriethoxysilane and 52 parts of dibutylhydrogenphosphite having the formula

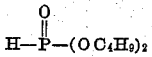

The mixture of ingredients was heated to a temperature of about 110 to 120° C. at which point alpha alpha'-azodiisobutyronitrile was added at 30 minute intervals in 0.1 part increments until 0.5 part of the azonitrile had been incorporated. During the addition of the azonitrile, the mixture of ingredients was stirred continuously. After all the azonitrile had been incorporated, the mixture of ingredients was heated at 120° C. for an additional two hours and fractionally distilled to yield 37 parts of a product which was identified as dibutyl phosphonoethyltriethoxysilane having the formula

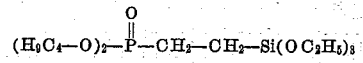

The composition had a boiling point of about 149–159° C. at 1–2 mm. mercury and had a refractive index N$_D$ 1.4320. Analysis of the compound showed it to contain 8.5% phosphorus as compared to the theoretical value of 8.1% phosphorus.

EXAMPLE 3

In this example, 70 parts diethylhydrogen phosphite and 60 parts methyl vinyldiethoxysilane were added to a three-necked flask equipped with stirrer and heating means and heated to a temperature of about 120° C. While maintaining the latter temperature and while continuously stirring the mixture of ingredients, increments (0.1 part) of alpha alpha'-azodiisobutyronitrile were added every 30 minutes for two hours. At the end of this time, the mixture was heated at about 120° C. for an additional two hours. Thereafter, the reaction product was fractionally distilled to obtain over 38 parts of the compound methyl (diethylphosphonoethyl)diethoxysilane having the formula

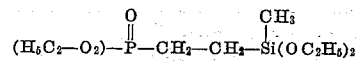

This material boiled at about 170–176° C. at 3–4 mm. mercury and had a refractive index N$_D$ 1.4365. Analysis of the compound showed it to contain 8.62% phosphorus which is close to the theoretical value, establishing that the desired compound was obtained.

EXAMPLE 4

This example illustrates the use of another free radical-producing catalyst in the preparation of the organophosphorus compositions of the present invention. More particularly, 15 parts methyl vinyldiethoxysilane and 12 parts diethyl hydrogenphosphite were heated to 120° C. similarly as in Example 3 and 0.1 part increments of benzoyl peroxide were added over a period of two hours. The mixture of ingredients was heated for about 15 hours at a temperature of around 120° C. and thereafter fractionally distilled to obtain a good yield of methyl (diethyl-phosphonoethyl)diethoxysilane having the same characteristics as the compound described in Example 3.

EXAMPLE 5

In this example, 25 parts methyl vinyldiethoxysilane was placed in a three-necked flask equipped with stirring and heating means. The latter silane was heated to a temperature of 130° C. at which point a mixture composed of 0.1 part alpha alpha'-azodiisobutyronitrile dissolved in 18 parts dimethylhydrogenphosphite having the formula

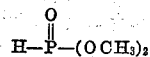

was added. The reaction mixture was heated at 130° C. while continuously stirring the same for four hours and thereafter fractionally distilled to yield about 13 parts methyl (dimethylphosphonoethyl)diethoxysilane having the formula

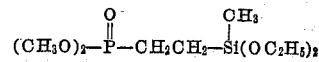

boiling at about 146–154° C. at 1–2 mm. mercury and having a refractive index N$_D$ 1.4400.

EXAMPLE 6

This example illustrates the types of catalysts which can be employed between either vinyltriethoxysilane or methyl vinyldiethoxysilane and diethylhydrogenphosphite. The conditions for reaction were essentially the same as those described in Examples 1 to 3 above, namely, the ethoxysilane and the diethyl hydrogen phosphite were placed in a suitable vessel using in some instances a three-necked flask similar to that employed above and in other instances a closed pressure reactor. Where the reaction was conducted at atmospheric pressure, the mixture of ingredients was heated at a temperature of about 150 to 160° C., the specified catalyst incorporated, and the mixture of ingredients further heated for a set period of time at elevated temperatures after which each product was fractionally distilled to give the desired alkyl phosphonoethylalkoxysilane. If pressure was employed (using a pressure reactor) the temperature of reaction was higher, for instance, from 170° to about 225° C. for times varying from about 4 to 6 hours. Thereafter, the reaction product was fractionally distilled again to yield the desired reaction product. The following Table I shows the ingredients used, the proportions of said ingredients, the type and amount of catalyst and the conditions of heating. In the table, the symbol "A" under "Reactants" indicates vinyltriethoxysilane, the symbol "B" indicates methyl vinyldiethoxysilane, and the symbol "C" indicates diethyl hydrogenphosphite. "Dimethyl Cellosolve" is the dimethyl ether of ethylene glycol.

*Table I*

| Sample Number | Reactant Used | Parts Reactant | Catalyst | Reaction Conditions | Product |
|---|---|---|---|---|---|
| 1 | A / C | 15 / 11 | Potassium Metal (0.2 part) | 170°C./4 hrs. (Pressure) | Diethyl-phosphonoethyl-triethoxysilane. |
| 2 | A / C | 120 / 100 | Potassium Salt of Dimethyl Cellosolve (1.8 parts). | 150-160°C./5 hrs | Same as 1. |
| 3 | A / C | 10 / 5.5 | 0.1 Part Potassium Salt of Dimethyl Cellosolve and 0.1 part triphenyl phosphine. | 225°C./6 hrs. (Pressure) | Same as 1. |
| 4 | B / C | 100 / 100 | 0.2 Part alpha, alpha'-azodiiso-butyronitrile. | 120° C./2 hrs | Methyl (diethylphosphonoethyl) diethoxy-silane. |
| 5 | Diethylvinyl-phosphonate (7 parts); Triethoxy-silane (10 parts). | | 0.1 Part Potassium Salt of Dimethyl Cellosolve. | 225° C./6 hrs. (Pressure). | Diethylphosphonoethyl-triethoxysilane. |

EXAMPLE 7

The compound diethyl phosphonopropyltriethoxysilane having the formula

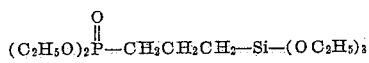

can be prepared similarly as described in Example 1 with the exception that one employs about 130 parts of allyl-triethoxysilane instead of 120 parts of vinyltriethoxysilane used in Example 1.

EXAMPLE 8

The compound phenyl di-(chloroethyl)phosphonoethyldiethoxysilane having the formula

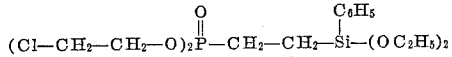

can be prepared similarly as described in Example 3 with the exception that one employs about 80 parts di-(chloroethyl) hydrogen phosphite in place of the 70 parts of diethyl hydrogen phosphite and 70 parts phenyl vinyldiethoxysilane in place of the 60 parts methyl vinyldiethoxysilane used in Example 3.

EXAMPLE 9

The compound diphenyl dibutylphosphonoethylethoxysilane having the formula

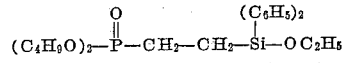

can be prepared similarly as described in Example 2 employing about 60 parts diphenyl vinylethoxysilane in place of the 50 parts vinyltriethoxysilane described in Example 2.

EXAMPLE 10

The compound bis(dibutylphosphonoethyl) diethoxysilane having the formula

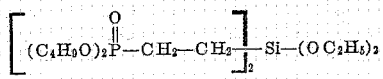

can be prepared similarly as described in Example 2 with the exception that one employs about 45 parts divinyl diethoxysilane in place of the 50 parts vinyltriethoxysilane recited in Example 2. There will probably be obtained small amounts of the mono-substituted derivative having the formula

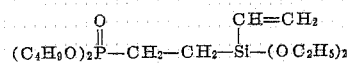

concurrently with the di-substituted derivative.

There are other examples of unsaturated alkenyl silanes which can be employed for reaction with the hydrogen organophosphites. Among such compositions may be mentioned alkoxy silanes of the formula

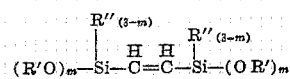

where R', R" and m are the same as those given above. Thus, one may effect reaction between bis-(triethoxysilyl) ethylene of the formula

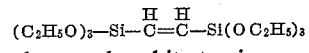

with diethyl hydrogen phosphite to give a compound having the formula

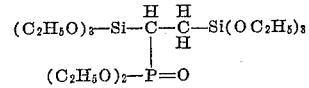

The starting triethoxysilyl ethylene can be obtained by reacting bis-(trichlorosilyl) ethylene (whose preparation is described in U. S. Patent 2,740,802—Pines, issued April 3, 1956) with ethyl alcohol.

The monomeric organophosphorus silanes described above, both generally and specifically, by means of the foregoing examples, can be hydrolyzed to give polymeric organopolysiloxanes in which siloxy units containing silicon-bonded organophosphonoalkylene radicals comprise from 5 to 100 mol percent of all the organosiloxy units in the organopolysiloxane. Using solely water, or slightly acidified water, one may hydrolyze the organophosphorus silane monomer alone, or one can hydrolyze mixtures of the latter silane in combination with other monomeric silanes of the formula $R''_mSi-OR'_{4-m}$ or $R''_mSi-X_{4-m}$, where R' and R" have the meanings given above, X is a halogen, e. g., chlorine, and m is an integer equal to from 1 to 3. At room temperature this hydrolysis preferentially hydrolyzes the —OR' group attached to silicon and affects little, if any, the organoxy groups attached directly to phosphorus. Alternatively, the organophosphorus monomeric silanes can be hydrolyzed to the organopolysiloxane state and thereafter intercondensed with other organopolysiloxanes, for instance, cyclic polysiloxanes having the formula

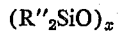

where R" has the meaning given above and $x$ in an integer equal to from 3 to 12 or more. For polymerization and interpolymerization, it is usually desirable that strongly acidic catalysts be employed such as phosphorus oxychloride, phosphonitrile chloride trimer $(PNCl_2)_3$ or tetramer $(PNCl_2)_4$, concentrated or fuming sulfuric acid, etc. An alternative procedure involves effecting hydrolysis between the hydrolyzable organophosphorus monomeric silane and an organosilanol or an organopolysiloxanol, for instance, diphenyl silanediol, trimethylsilanediol, diethylsilanediol, tetramethyldisiloxanediol, 1,3-diphenyl-1,3-vinyl disiloxanediol, tetramethyldisiloxanediol, tetraphenyldisiloxanediol, dimethyldivinyldisiloxanediol, etc.

It should be understood that a small percentage of the organoxy group on phosphorus will also undergo hydrolysis to yield phosphorus-bonded hydroxyl groups which can condense with silanol groups to split out water yielding some cross-linking with the concomitant formation of

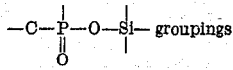

EXAMPLE 11

A homogeneous mixture was prepared from 50 parts methyl (dibutylphosphonoethyl) diethoxysilane, 50 parts hexamethylcyclotrisiloxane, and 50 parts tetramethyldisiloxanediol. The mixture of ingredients was heated to a temperature of about 160° C. and while stirring at this temperature, a few drops of fuming sulfuric acid were added. Thereafter, the reaction product was subjected to reduced pressure (about 30 mm. mercury) for about 30 minutes to remove the formed ethanol and water. There was thus obtained a clear firm polymer which was found to be insoluble, when immersed for 24 hours, in a mixture of toluene and isooctane in the proportion of 70 parts of the toluene to 30 parts of the isooctane. This polymer was an interpolymerized product containing dimethylsiloxy units and units of the formula

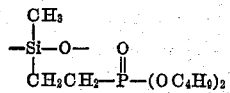

EXAMPLE 12

About 50 parts methyl (dibutylphosphonoethyl) diethoxysilane, 50 parts tetramethyldisiloxanediol and 50 parts hexamethylcyclotrisiloxane were mixed together and thereafter heated to a temperature of about 80° C. at which point a few drops of phosphorus oxychloride were added and the pressure reduced to about 30 mm. mercury to remove, by distillation, ethanol and water. There was thus obtained a solid polymer composed of dimethylsiloxy units and methyl dibutylphosphonoethylsiloxy units, which again was insoluble in the toluene-isooctane mixture described in Example 11.

EXAMPLE 13

In this example 46 parts methyl (dibutylphosphonoethyl)diethoxysilane were mixed with 50 parts tetramethyldisiloxanediol and the mixture of ingredients was heated to 80° C., and thereafter a few drops of phosphorus oxychloride were added. The mixture of ingredients was stirred for a short period of time and thereafter subjected to vacuum distillation at room temperature for 30 minutes at a pressure of about 30 mm. mercury. A clear, firm polymer was obtained which again was found to be insoluble in the above-mentioned mixture of toluene and isooctane. This composition was a copolymer containing interpolymerized dimethylsiloxy units and methyl phosphonoethylsiloxy units of the formula

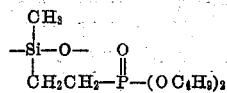

EXAMPLE 14

A mixture of ingredients composed of 5 parts diethylphosphonoethyltriethoxysilane, 2.26 parts dimethyldiethoxysilane, 18 parts toluene, and 1.09 parts water was prepared, and the reaction mixture was heated at a temperature of 110–115° C. for about 15 minutes, and thereafter the reaction product was subjected to vacuum distillation to remove the resulting ethanol. The solution was filtered and about 0.01 percent, by weight of the solution, tetramethyl ammonium hydroxide, was added and the solution was poured on to a metal surface and the film thus deposited was allowed to remain at room temperature so as to evaporate the solvent. After it was evident that all the toluene solvent had been evaporated, the resinous film was heated at 150° C. for one hour to give a clear thermoset transparent film. Samples of this cured film were then placed in toluene for one hour and thereafter removed to determine whether any of the resin film had dissolved in the toluene. This test showed that essentially no solids were extracted with the toluene from the cured resinous film, indicating the toluene insolubility of the resinous product, which was composed of recurring dimethylsiloxy units and trifunctional phosphonoethyl units of the formula

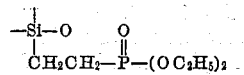

Strips of the resin cured above (Example 14) were also additionally cured for one hour at 100° C. and one hour at 150° C. after which they were placed in toluene at room temperature for 18 hours. The dimensions of the film before and after immersion in toluene were determined to see whether there was any swelling in the toluene. This test showed that scarcely any swelling had occurred, which is unusual for organopolysiloxane resins because they are ordinarily sensitive to toluene and swell quite readily in such a solvent medium. The actual measurements of the film before immersion were 28 mm. x 11 mm. and after immersion for 18 hours in toluene the measurements were 29 mm. x 12 mm. When the resin film was immersed in toluene for 78 hours after curing the film one hour at 100° C. and 3 hours at 150° C., it was found that the dimensions of the film were essentially unchanged.

EXAMPLE 15

A resin was prepared by adding five parts diethylphosphonoethyltriethoxysilane and 0.83 part water to a distilling flask and the mixture shaken until homogeneous. Thereafter 3.3 parts diphenylsilanediol and 16 parts toluene were added to the solution. The mixture was heated to 120° C. and kept at this temperature until all the ethanol had been removed. The solution was then filtered and poured on to a metal surface and the solvent allowed to evaporate at room temperature. The resin film was cured at 100° C. for 30 minutes and then at 150° C. for 30 minutes. The resinous film, which was composed of recurring diphenylsiloxy units

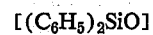

and trifunctional diethylphosphonoethylsiloxy units of the formula

was quite hard and appeared to be more resistant to scratching than the film described in Example 14.

EXAMPLE 16

Fifty parts diethylphosphonoethyltriethoxysilane and 50 parts methyl (diethylphosphonoethyl) diethoxysilane were mixed with 10 parts water until a homogeneous mixture was obtained. About 0.01 part acetic acid was added and the mixture of ingredients stirred while the temperature was raised to 120° C. While at this temperature, volatile ethanol and water (from silanol condensation) formed in the reaction mixture were removed by distillation to give a resin solution. The solution was filtered and made alkaline with about 0.1 percent tetramethyl ammonium hydroxide (dissolved in methanol), based on the weight of the distillation residue. The resin was then deposited as a film and heated for 30 minutes at 100° C. and then 30 minutes at 150° C. to give a clear transparent film which was hard and insoluble in toluene. The resin was composed of recurring

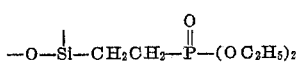

and

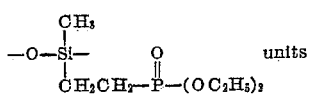

units

EXAMPLE 17

About 15 parts methyl (dibutylphosphonoethyl) diethoxysilane were thoroughly mixed with about 1.5 parts water at around 25 to 35° C. The resulting hydrolyzate was soluble in water indicating a high silanol-containing organopolysiloxane. The reaction product was then subjected to reduced pressure of about 30 mm. mercury and the mixture of ingredients heated under this reduced pressure to remove the formed ethanol. The resulting resin solution was heated to 140–150° C. and at that point about 0.02 part zinc octoate was added to condense the above-prepared polysiloxane, and a reduced pressure of about 30 mm. mercury was again applied to remove the water as it was formed. There was thus obtained a clear firm polymer having recurring

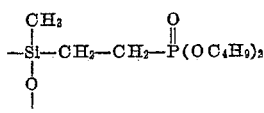

units, which was insoluble in the above described toluene-isooctane mixture.

EXAMPLE 18

In this example, 10 parts methyl (dibutylphosphonoethyl)diethoxysilane, 10 parts hexamethylcyclotrisiloxane, and 10 parts tetramethyldisiloxanediol were mixed together and heated to 80° C. until a homogeneous mixture was obtained. While at this temperature, 0.3 part methyl vinyldiethoxysilane and a few drops of $POCl_3$ were added and the mixture thereafter heated at 80° C. under reduced pressure similarly as was done in Example 19 to give a clear, firm polymer which was insoluble in the mixture of toluene and isooctane.

EXAMPLE 19

About 27.5 parts methyl (dibutylphosphonoethyl)diethoxysilane and 23 parts phenyltrichlorosilane were dissolved in about 43 parts ethyl acetate and this solution was then added with vigorous stirring to about 200 parts of water. The organic layer thus obtained was separated, washed with water and dried with anhydrous sodium sulphate to give a resinous solution containing phenylsiloxy ($C_6H_5SiO$) units and siloxy units of the formula

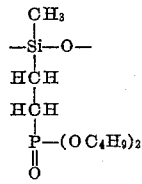

This resin solution was separated into five portions and to each portion was added about 0.02 percent, by weight thereof, tetramethyl ammonium hydroxide, or tin octoate, or zinc octoate, or zirconium octoate, or no curing agent at all. The five resin solutions were then deposited on a metal surface and heated at 100° C. for 30 minutes and thereafter at 150° C. for one hour to yield in every instance clear, transparent films which had good heat resistance and which showed no apparent attack by the above mixture of toluene and isooctane when covered with the latter mixture of solvents.

EXAMPLE 20

42 parts methyl (diethylphosphonoethyl)diethoxysilane and 10 parts methyltrichlorosilane were dissolved in 42 parts ethyl acetate and this solution was added slowly with stirring to 200 parts water. The resin solution thus obtained was washed until neutral, distilled to remove residual ethanol and water and thereafter cast into a film which upon drying in air was converted to a clear, flexible, transparent film composed of recurring methylsiloxy units and methyl diethylphosphonoethylsiloxy units.

EXAMPLE 21

30 parts methyl (diethylphosphonoethyl)diethoxysilane and 30 parts diethylphosphonoethyltriethoxysilane were dissolved in 90 parts ethyl acetate and the solution added slowly with stirring to 200 parts water. The resin solution thus obtained was heated under reduced pressure to remove water and formed ethanol. This latter silicone resin solution was deposited on a metal surface in the form of a film and heated at 150° C. for one hour to yield a cured, flexible, transparent film which exhibited no apparent solubility in the mixture of toluene/isooctane discussed above.

EXAMPLE 22

100 parts methyl (diethylphosphonoethyl)diethoxysilane, 50 parts methyltrichlorosilane and 50 parts dimethyldichlorosilane were dissolved in 180 parts trichloroethylene. This solution was thereafter added slowly with stirring to 600 parts water. The resin solution thus obtained was heated under reduced pressure similarly as done in the preceding examples to remove formed ethanol to give a solution of the formed resin in trichloroethylene. A film deposited from this solution and heated for one hour at a temperature of 150° C. yielded a heat-resistant film which was clear, flexible and showed essentially no solubility in the mixture of toluene and isooctane used in the preceding examples. The resin was composed of trifunctional methylsiloxy units, difunctional methyl diethylphosphonoethylsiloxy units and difunctional dimethylsiloxy units.

It will, of course, be apparent to those skilled in the art that other organo-phosphorus monomeric silanes may be prepared in addition to those described in the foregoing examples without departing from the scope of the invention. Thus, as pointed out previously, there may be combined other organoxy phosphites, many examples of which have been given above with other organo-alkoxysilanes, again many examples of which have been given above, to yield various types of monomeric organophosphorus silanes. In addition, it will be apparent to those skilled in the art that many of the monomeric organophosphorus silanes described above, as well as those which can be prepared in accordance with the description in the present invention, can be used to prepare other types of organic polymers.

These polymers will be recognized by the fact that they contain groupings of the formula (IV) 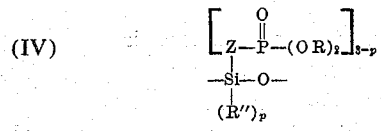

where R and R″ and Z have the meanings given above, and $p$ is a whole number equal to from 0 to 2. Alternatively, the polymeric unit referred to in Formula IV may be intercondensed with other diorganosiloxy units, for instance, dimethylsiloxy, diphenylsiloxy, methyl phenylsiloxy units, etc.; with trifunctional organosiloxy units, for instance, methylsiloxy units of the formula

phenylsiloxy units of the formula

where there is attached to silicon only one organic group by means of a silicon-carbon linkage, as well as triorganosiloxy units, such as trimethylsiloxy units of the formula $(CH_3)_3Si$—O— which act as chain-stopping units.

Thus, by intercondensing trimethylethoxysilane, dimethyldiethoxysilane, and a compound of the formula

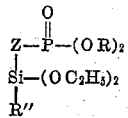

one can obtain chain-stopped organopolysiloxane oils which have good lubricating characteristics because of the presence of phosphorous, said compositions having the general formula

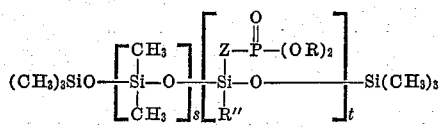

where $s$ is equal to 0 or a whole number equal to 1 or above, e. g., as high as 1,000 or more, and $t$ is an integer equal to at least 1 and above, e. g., to 1,000 or more, and R, R″ and Z have the meanings given above. If desired, R″ may be substituted by another phosphonoalkylene radical and the methyl groups may be different organic radicals similar to those recited for R″ above.

Alternatively, organopolysiloxane rubbers may be prepared from the organophosphorus silicon compositions, for instance, by hydrolyzing methyl (diethylphosphonoethyl) diethoxy silane to obtain a silanol having the formula

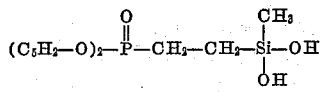

and thereafter effecting condensation and polymerization of the latter with small amounts of strong acids such as fuming sulfuric acid, $POCl_3$, etc., either alone or in combination with other copolymerizable compositions, e. g., organopolysiloxanes, for instance octamethylcyclotetrasiloxane, tetramethyltetravinylcyclotetrasiloxane, mixtures of octamethylcyclotetrasiloxane and hexaphenylcyclotrisiloxane, or with tetramethyltetraphenylcyclotetrasiloxane, etc.; methylvinyldiethoxysilane, etc., to give highly viscous organopolysiloxanes convertible by heat to the cured, solid, elastic state.

The above convertible organopolysiloxane gums are advantageously admixed with various fillers to improve the physical properties, for instance, the tensile strength of the products. Among such fillers may be mentioned silica aerogel, fume silicas, diatomaceous earth, precipitated silicas, titanium dioxide, etc., in amounts ranging, by weight, from about 0.2 to 2 parts filler per part of the convertible organopolysiloxane. Thereafter, suitable curing agents can be added in amounts ranging from about 0.1 to 6 to 8 percent or more, based on the weight of the mixture of ingredients, and thereafter heated, preferably under pressure in a mold at temperatures ranging from about 100 to 250° C. for times of the order of about 15 minutes to 36 hours or more to give cured, vulcanized products having good resistance to aromatic solvents and being thermally stable for long periods of time at temperatures above 150° C. while still retaining their flexibility at temperatures as low as —125° C. Such materials are particularly useful as gaskets, for instance, in airplane construction where the gasket may be in positions which may be subjected to both high and low temperatures, and yet require maintenance of their flexibility and strength characteristics within this temperature range.

The filled organopolysiloxane containing the silicon-bonded organophosphonoalkylene group described above which are convertible to the cured, solid, elastic state have unexpectedly been found incapable of vulcanization by high energy electrons. This resistance to curing by high energy electrons suggests applications for the cured products (which may be cured by chemical means) in places where radiation is a serious hazard and a cause of degradation or decomposition of the usual rubber products. Thus, gaskets made of filled organopolysiloxanes containing the organophosphonoalkylene group can be used in installations generating various types of powers from sources based on atomic products, without undesirable changes in the gasket.

In addition to the compositions described above, one can also effect reaction between organophosphorus compounds of the formula

and organosilanes of the formula

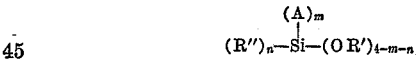

to yield compositions having the formula

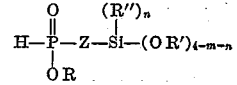

where A, Z, R, R′, R″, $m$ and $n$ have the meanings given above and $m+n$ do not exceed 3.

Where the alkenyl silane contains two silicon-bonded alkenyl radicals, it is possible to yield linear polymers which may have applications in fiber formation, coating compositions, molding, for instance, extruding applications, etc. Thus, one could effect reaction, for instance, between

where R has the meaning given above, and an organoalkenylsilane having the formula $(CH_2=CH)_2Si—(OC_2H_5)_2$ to give linear polymers (employing free radical catalysts for the purposes of the type described above) having the recurring structural unit

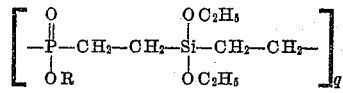

where $q$ is an integer in excess of one, for instance, as much as 15 to 2,000 or more. Such compositions can be cross-linked by means of hydrolytic procedures through the medium of the silicon-bonded alkoxy radicals to give thermoset products in contrast to the linear polymers which would be of a thermoplastic nature.

What I claim as new and desire to secure as Letters Patent of the United States is:

1. A composition of matter having the general formula

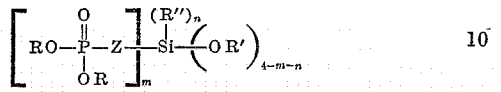

where R is a member selected from the class consisting of monovalent hydrocarbon radicals and monovalent hydrocarbon radicals which are substituted with halogen, R' is a monovalent hydrocarbon radical, R'' is a member selected from the class consisting of monovalent hydrocarbon radicals and halogenated monovalent hydrocarbon radicals, Z is a divalent alkylene radical of from 2 to 4 carbon atoms, $m$ is an integer equal to from 1 to 3, and $n$ is a whole number equal to from 0 to 2, inclusive, the sum of $m+n$ not exceeding 3.

2. The chemical compound diethyl phosphonoethyltriethoxysilane having the formula

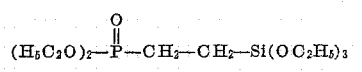

3. The chemical compound dibutyl phosphonoethyltriethoxysilane having the formula

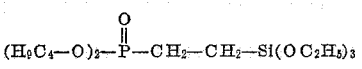

4. The chemical compound methyl (diethylphosphonoethyl) diethoxysilane having the formula

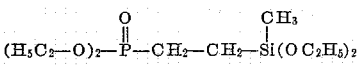

5. The chemical compound methyl (dimethylphosphonoethyl) diethoxysilane having the formula

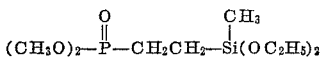

6. The chemical compound diethyl phosphonopropyltriethoxysilane having the formula

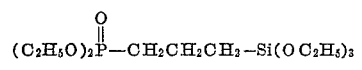

7. The process for making compositions having the formula

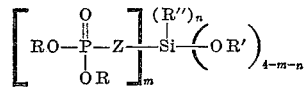

which process comprises effecting reaction between a compound having the formula

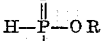

and an alkenyl organoxy silane of the formula

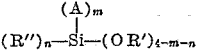

where R is a member selected from the class consisting of monovalent hydrocarbon radicals and halogen-substituted monovalent hydrocarbon radicals, R' is a monovalent hydrocarbon radical, R'' is a member selected from the class consisting of monovalent hydrocarbon radicals and halogenated hydrocarbon radicals, $m$ is an integer equal to from 1 to 3, $n$ is a whole number equal to from 0 to 2, inclusive, the sum of $m+n$ not exceeding 3, Z is a divalent alkylene radical of from 2 to 4 carbon atoms, and A is an alkenyl radical selected from the class consisting of vinyl, allyl and methallyl radicals, the carbon chain length of Z and A being the same.

8. The process as in claim 7 in which the reaction is carried out in the presence of a free radical producing catalyst.

9. The process for making diethyl phosphonoethyltriethoxysilane which comprises effecting reaction between diethyl hydrogen phosphite and vinyltriethoxysilane.

10. The process for making dibutyl phosphonoethyltriethoxysilane which comprises effecting reaction between dibutyl hydrogen phosphite and vinyltriethoxysilane.

11. The process for making methyl (diethylphosphonoethyl) diethoxysilane which comprises effecting reaction between diethyl hydrogen phosphite and methyl vinyldiethoxysilane.

12. The process for making methyl (dimethylphosphonoethyl) diethoxysilane which comprises effecting reaction between dimethyl hydrogen phosphite and methyl vinyldiethoxysilane.

13. The process for making diethyl phosphonopropyltriethoxysilane which comprises effecting the reaction between diethyl hydrogen phosphite and allyl triethoxysilane.

References Cited in the file of this patent

UNITED STATES PATENTS 2,768,193    Gilbert _____ Oct. 23, 1956

FOREIGN PATENTS 1,118,495    France _____ Mar. 19, 1956

OTHER REFERENCES

Arbuzov et al.: "Dokladii Akad Nauk (U. S. S. R. Academy of Science Reports)," vol. 59 (No. 8), pp. 1433–35 (1948).

Burkhard: "J. Am. Chem. Soc.," vol. 72 (1950), pp. 1078–80.